United States Patent [19]

Han

[11] Patent Number: 5,661,528

[45] Date of Patent: Aug. 26, 1997

[54] APPARATUS AND METHOD FOR CONTROLLING OPERATION OF A HIGH DEFINATION TELEVISION ADAPTIVE EQUALIZER

[75] Inventor: Dong-Seog Han, Songtan, Rep. of Korea

[73] Assignee: Samsung Electronics Co., Ltd., Kyungki-do, Rep. of Korea

[21] Appl. No.: 476,023

[22] Filed: Jun. 7, 1995

[30] Foreign Application Priority Data

Jun. 14, 1994 [KR] Rep. of Korea ................. 13345/1994

[51] Int. Cl.$^6$ ........................... H04N 5/21; H04N 5/455
[52] U.S. Cl. ..................... 348/607; 348/726; 348/731; 375/232
[58] Field of Search ........................... 348/627, 611, 348/614, 725, 726, 731, 426; 364/724.11, 724.19, 724.2; 375/232, 233, 350; 333/18, 28 R; H04N 5/21, 5/455

[56] References Cited

U.S. PATENT DOCUMENTS

| | | | |
|---|---|---|---|
| 4,949,168 | 8/1990 | Ninomiya et al. | 358/21 |
| 5,099,496 | 3/1992 | Pope et al. | 364/724.2 |
| 5,134,464 | 7/1992 | Basile et al. | 348/426 |
| 5,243,624 | 9/1993 | Paik et al. | 364/724.19 |
| 5,311,545 | 5/1994 | Critchlow | 375/332 |
| 5,561,468 | 10/1996 | Bryan et al. | 348/473 |

OTHER PUBLICATIONS

Eicchi et al ,"Blind Equallization and Carrier Recovery Using a Stop & Go Decision-Directed Algorithm", Sep. 1987, pp. 877–887.

Primary Examiner—Victor R. Kostak
Assistant Examiner—Jeffrey J. Murrell
Attorney, Agent, or Firm—Sughrue, Mion, Zinn, Macpeak & Seas

[57] ABSTRACT

An adaptive equalizer for use in a high definition television (HDTV) receiver, which includes a filtering device having a first filter for FIR (Finite Impulse Response) filtering by receiving a real signal and a real coefficient for output from the filtering device, a second filter for FIR filtering by receiving the real signal and an imaginary coefficient, a third filter for FIR filtering by receiving the real coefficient and an imaginary signal, and a fourth filter for FIR filtering by receiving the imaginary signal and the imaginary coefficient. The adaptive equalizer also includes an adding device having a first adder and a second adder, the first adder subtracting the second filter output from the first filter output in the filtering device, and the second adder adding the outputs of the third and fourth filters. Further, the adaptive equalizer includes an equalization coefficient calculation and downloading device for calculating an equalization coefficient according to the outputs of real and imaginary parts from the first and second adders in the adder to thereby provide the real coefficient and the imaginary coefficient.

11 Claims, 5 Drawing Sheets

APPARATUS AND METHOD FOR CONTROLLING OPERATION OF A HIGH DEFINATION TELEVISION ADAPTIVE EQUALIZER

BACKGROUND OF THE INVENTION

The present invention relates to an adaptive equalizer for use in a high definition television (HDTV) receiver, and more particularly to an apparatus and a method for controlling the operation of the adaptive equalizer which is capable of reducing interference of a signal due to a multi-path or fading phenomenon in a channel.

In general, a high definition television receiver is known as a next generation television system which has picture quality being on the same level as that of 35 millimeter cinema film, and tone quality being on the same level as that of a compact disc. The high definition television receiver includes an adaptive equalizer for normally regenerating a received signal that has been degraded by multi-path or fading phenomenon occurring within a broadcasting channel over which the signal is transmitted. Such an adaptive equalizer is comprised of a filter having finite impulse response (FIR) characteristic in order to compensate for degradation of the receiving signal due to transmission over the digital communication system channel.

Typically, a telephone line modem is representative of a system employing a known adaptive equalizer. In this case, the data transmission rate is about 2400 sps (symbol per second). However, the known adaptive equalizer cannot be used in a high definition television system which digitally processes all received signals, because the high definition television system requires a data transmission rate of about 5 Msps. Therefore, it is necessary to provide an apparatus and a method for controlling the real time operation of a high definition television adaptive equalizer in order for it to perform at a high rate of transmission speed. In order to compensate for the multi-path and the fading phenomenon generated within the transmission channel, the length of the multi-path error, controllable in the adaptive equalizer, differs according to the length of a FIR filter and equalization algorithm. However, the length should generally be between a corresponding delay of −2 µs and +24 µs. In this case, the number of taps in an adjustable filter is about 100 to 256. When the HDTV receiver initially operates, the effects of all multi-path signals to a corresponding delay of between −2 µs to +24 µs are equalized by an adaptive equalizer, however, this requires a long initialization time. Moreover, according to the state of the art of current digital signal processing techniques, it is very difficult to obtain, in real time, approximately 100 to 256 coefficients from a single input symbol where the received signal has a data transmission rate of about 5 Msps. Therefore, a HDTV receiver adaptive equalizer must have a short waiting period until the recovered video and audio signals are available. Accordingly, solutions are needed to minimize the waiting period.

SUMMARY OF THE INVENTION

It is therefore object of the present invention to provide a method for controlling the operation of an adaptive equalizer of a high definition television within a short period of time.

It is another object of the present invention to provide an apparatus and a method for controlling an operation of a modem, which includes an adaptive equalizer of a high definition television receiver.

The method according to the present invention, which satisfies the above objects, comprises the steps of initializing a plurality of elements of the modem; acquiring a synchronous clock signal from a received signal by operating a symbol timing recovery loop when an adaptive equalizer and a carrier recovery loop are initialized; determining an output error value for equalization of the received signal demodulated by an adaptive equalizer when said carrier recovery loop is initialized; and operating said plurality of elements of said modem including said carrier recovery loop when said output error value is less than a preset value.

According to the other object, a modem apparatus of a high definition television comprises: tuner for tuning a received radio frequency signal to thereby convert said tuned signal into an intermediate frequency band; demodulator connected to said tuner, for demodulating said converted signal; filter for matching a signal demodulated by said demodulator; symbol timing recovering unit for receiving an output of said filter to thereby generate timing information; an adaptive equalizer for adaptively equalizing said filter output in order to compensate for degradation of said received signal, in response to said timing information of said symbol timing recovering unit; and recovery unit for recovering a carrier of said received signal by receiving an output of said adaptive equalizer.

In the present invention, the real time process must renew the adaptive equalizer coefficient in order to eliminate multi-path corresponding to several microseconds of signal delay, during the initial operation of the HDTV receiver by considering that transmission path delay which occurs due to a multi-path phenomenon typically results in a signal delay of less than several microseconds.

BRIEF DESCRIPTION OF THE DRAWINGS

The above and other objects, advantages and features of the present invention will be more apparent from the following detailed description taken with consideration of the attached drawings, in which.

DETAILED DESCRIPTION OF THE PREFERRED EMBODIMENT

In the following description, the specific details regarding a particular embodiment of the invention are set forth to provide a more thorough understanding of the present invention. It will be apparent, however, to one skilled in the art that the present invention may be practiced without adherence to these specific details. In other instances, well known features have not been described in detail so as not to obscure the present invention.

Figure 1:
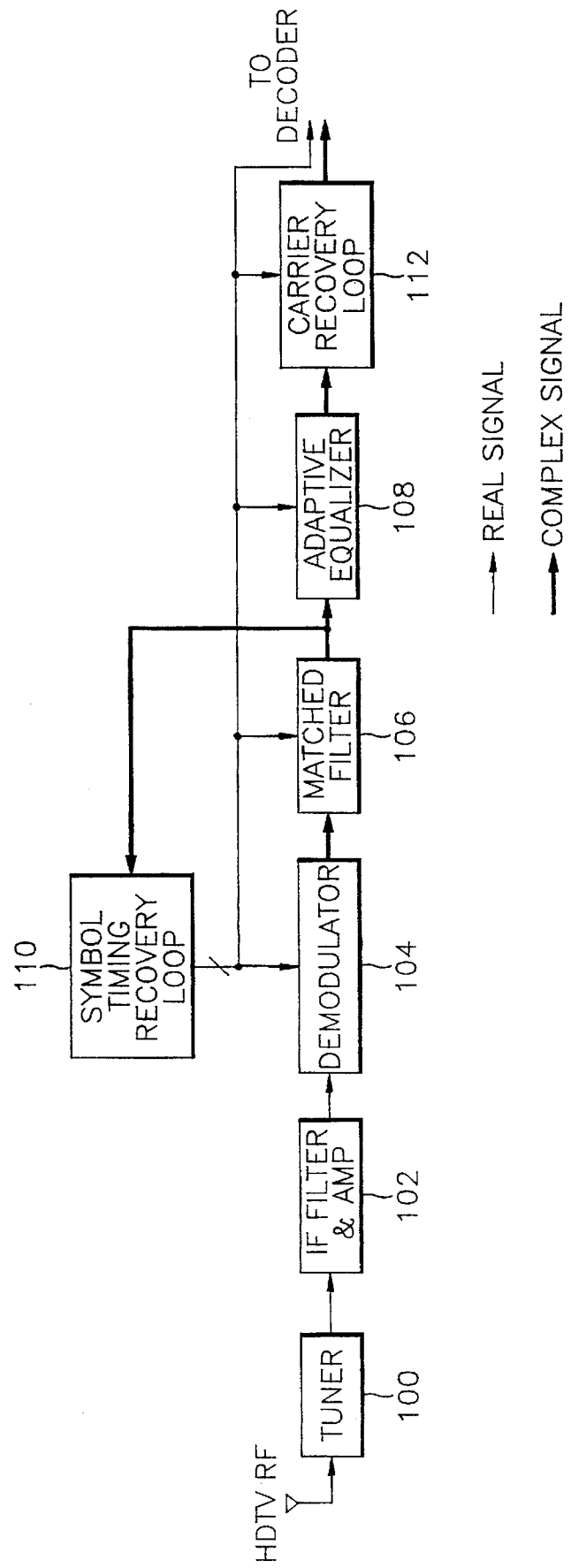
FIG. 1 is a block diagram showing a modem portion of a high definition television system according to the present invention.

Referring to FIG. 1, this figure is shown to explain a construction of a modem portion of an HDTV receiver which includes an adaptive equalizer according to the present invention. The modem portion includes a tuner 100, an Intermediate Frequency (IF) filter and amplifier 102, a demodulator 104, a matched filter 106, an adaptive equalizer 108, a symbol timing recovery loop 110, and a carrier recovery loop 112.

An HDTV receiver includes the modem portion and a decoder (not shown). The modem portion demodulates video and audio signals transmitted after being encoded and modulated in an HDTV transmitter (not shown). The decoder decodes the received data to reproduce the transmitted video and audio signals. In FIG. 1, tuner 100 tunes into an HDTV RF signal received by an antenna. The IF filter and amplifier 102 filters the received RF signal to convert it to an intermediate frequency band signal, and amplifies the filtered signal, respectively. Demodulator 104 demodulates the amplified signal. Matched filter 106 functions as a filter for matching an output of the demodulator 104, the output of which is provided to adaptive equalizer 108 and symbol timing recovery loop 110. By using the output of the matched filter 106, the symbol timing recovery loop 110 extracts timing information required for the operation of demodulator 104, matched filter 106, adaptive equalizer 108, and carrier recovery loop 112. Adaptive equalizer 108 responds to the timing information provided by symbol timing recovery loop 110 and adaptively equalizes the output signal of matched filter 106 in order to compensate for signal degradation generated due to the effects of the transmission channel on the transmitted signal. Carrier recovery loop 112 receives an output of adaptive equalizer 108 to thereby compensate for carrier frequency error, phase error, and phase jitter. An output of the carrier recovery loop 112 is provided to a decoder of the HDTV receiver (not shown).

Figure 4:
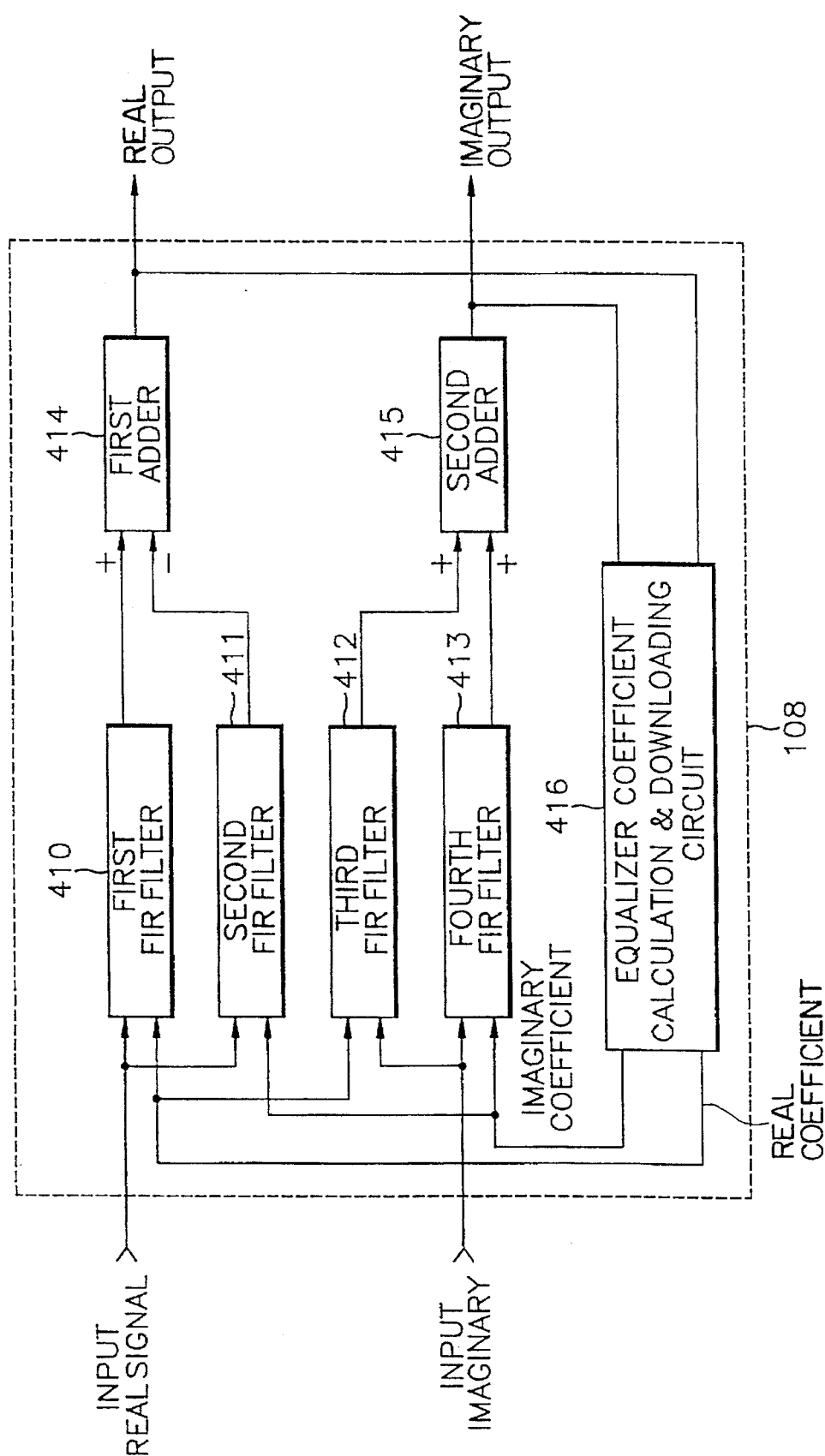
FIG. 4 is a detailed block diagram showing an adaptive equalizer within the modem portion of the HDTV system, according to FIG. 1.

Detailed construction of the adaptive equalizer 108 according to an embodiment of the present invention is shown in FIG. 4. Referring to FIG. 4, the adaptive equalizer 108 includes first, second, third, and fourth FIR filters 410–413, first and second adders 414–415, and an equalizer coefficient calculation & downloading circuit 416. An input real signal and an input imaginary signal comprise the multiplexed digital signals of image, audio, and data which are separated by the matched filter 106. The real and imaginary signals represent real and imaginary components, respectively, of the multiplexed signal.

The four FIR filters employ real and imaginary coefficients. The two adders 414 and 415, are used for addition and subtraction, respectively. The equalizer coefficient calculation & downloading circuit 416 provides calculated coefficients to the FIR filters. The equalizer coefficient calculation & downloading circuit 416 receives the real and imaginary signal outputs, which are provided from the first and second adders 414 and 415, thereby generating a real coefficient and an imaginary coefficient.

Figure 3:
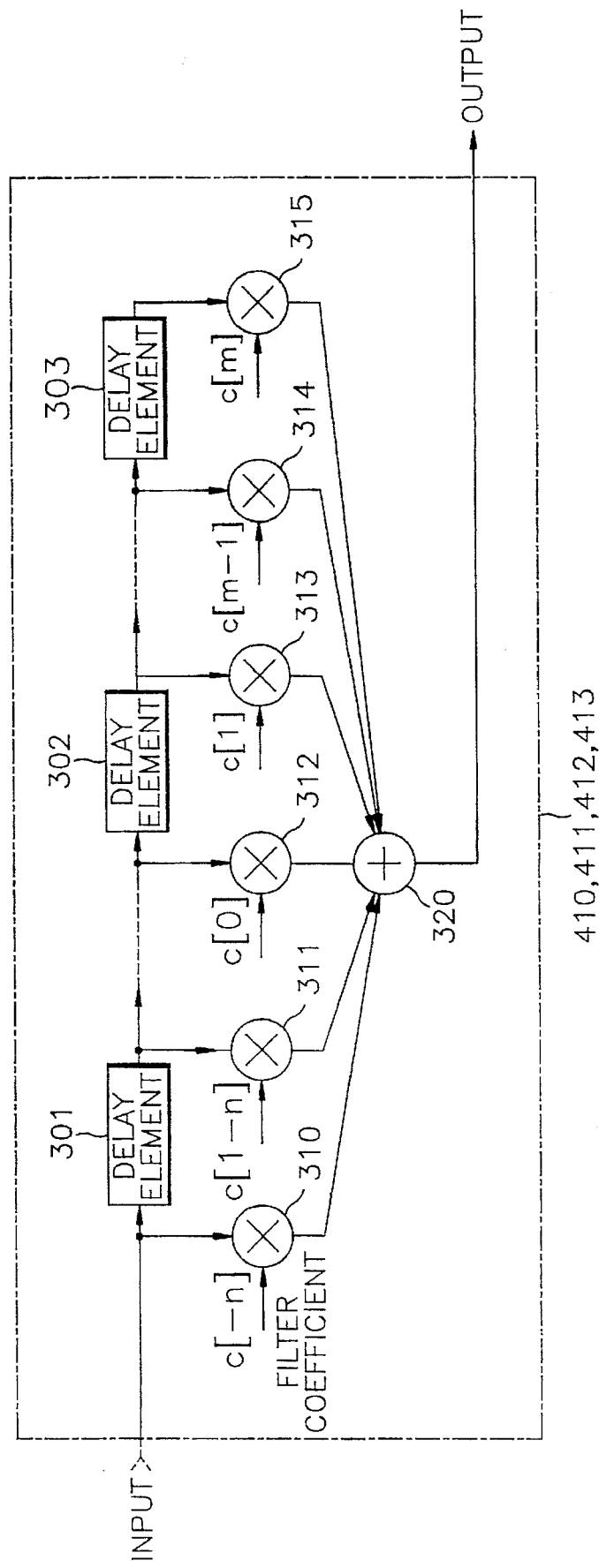
FIG. 3 is a diagram showing a FIR filter construction according to the present invention.

The first FIR filter 410 receives the input real signal and the real coefficient to thereby perform a FIR filtering operation. The second FIR filter 411 receives the input real signal and the imaginary coefficient to thereby perform a FIR filtering operation. The third FIR filter 412 receives the real coefficient and the imaginary signal to thereby perform a FIR filtering operation. Fourth FIR filter 413 receives the imaginary signal and the imaginary coefficient to thereby perform a FIR filtering operation. First adder 414 subtracts the output of second FIR filter 411 from an output of first FIR filter 410. The output of first adder 414 is provided as the real component output signal. Second adder 415 adds the output of third FIR filter 412 to that of four FIR filter 413 to thereby provide the added output as the imaginary component signal. FIG. 3 shows in detail the construction of the first, second, third, and fourth FIR filters 410–413, which are each constructed identically to one another.

With respect to FIG. 3, the signal input to an input stage can be either the input real or imaginary signal and the other input signal, which is applied as a filter coefficient, can be either the real or imaginary coefficient. For simplicity in explaining the present invention, the filter coefficient is denoted as "C". Delay elements 301–303 shown in FIG. 3 each correspond to a delay circuit providing a delay of one sample. Multipliers 310–315 are each used for multiplying the delayed sample signal by a given filter coefficient. An adder 320 is used for adding all the outputs of multipliers 310–315.

A method for controlling the modem of FIG. 1 and the adaptive equalizer of FIG. 4 is explained as follows.

Figure 2A:
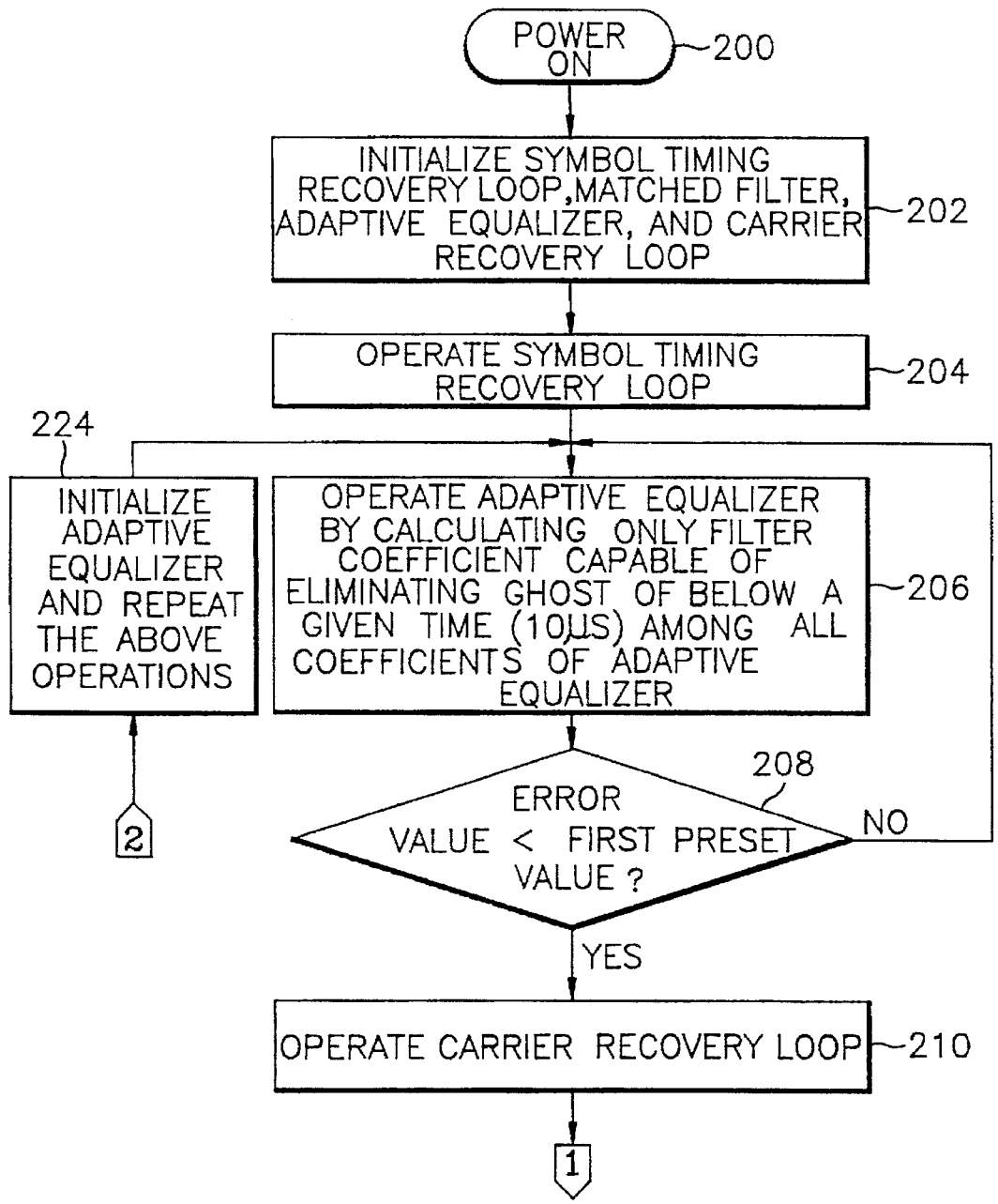
FIGS. 2(A) and 2(B) are flow charts showing the operational control of an adaptive equalizer according to the present invention.
Figure 2B:
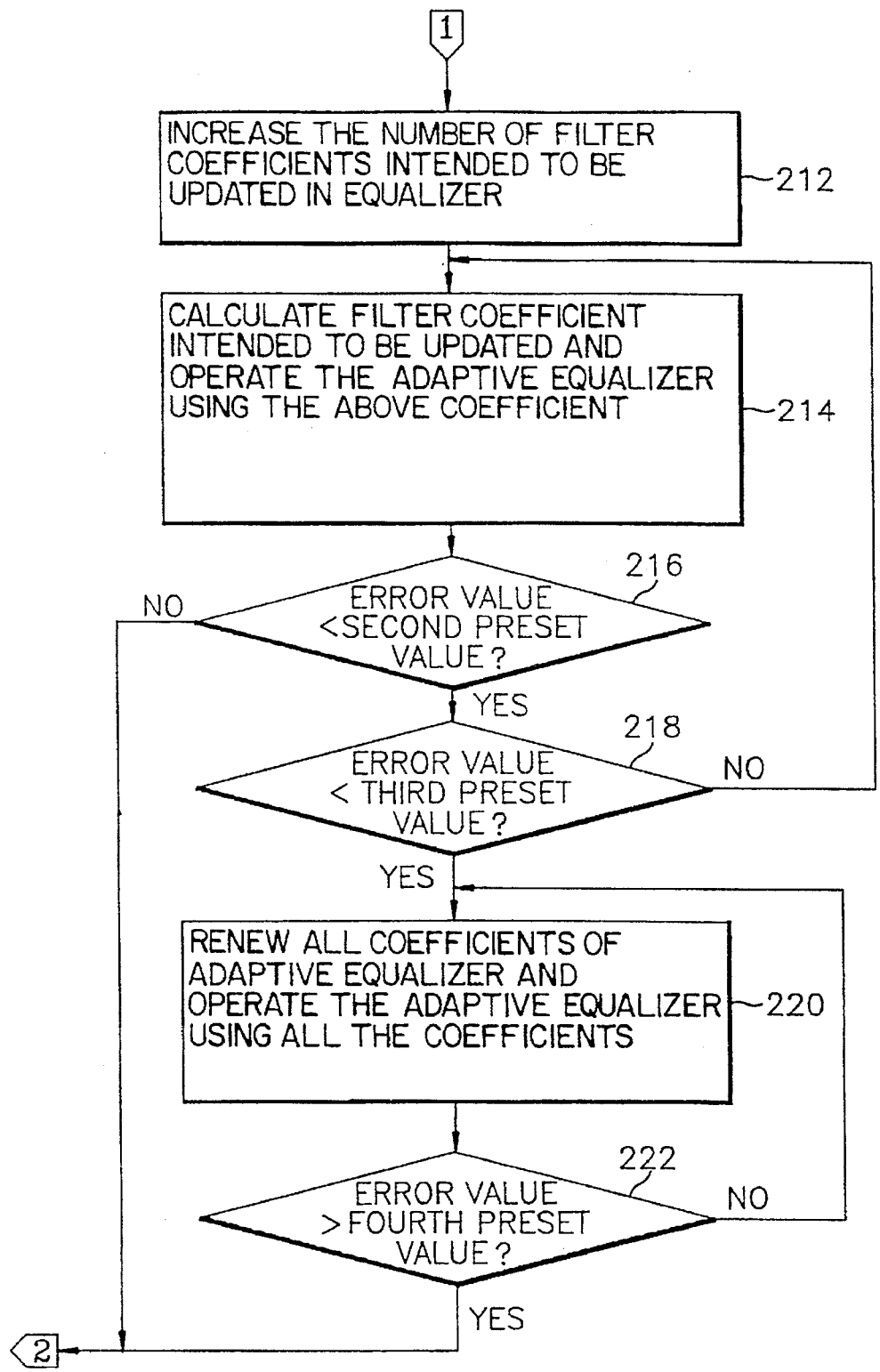

Steps 200–224, shown in FIGS. 2(A) and (B), depict steps for controlling the operation of each block within the modem. In order to perform real-time processing the coefficient supplied to the adaptive equalizer must be updated by considering that the transmission path delay generated due to multi-path is typically less than +10 μs, in order to thereby eliminate such a delay during an initial operation of the HDTV receiver. That is, only the coefficients $c[-n]$, $c[-n+1]$ ..., $c[0]$, $c[1]$ ..., $c[i]$ ($i<m$) are updated among all of the FIR filter coefficients in the adaptive equalizer, these coefficients being capable of offsetting multi-path delay of +10 μs and below. At this time, only the coefficient of an intermediate tap (i.e. $c[0]$) of the adaptive equalizer is set to $1+j0$, and all the other coefficients are set to 0 when initializing the adaptive equalizer. Further, it is necessary to calculate a mean square error MSE of the adaptive equalizer's output, together with updating the coefficients $c[-n+1]$ through $c[i]$. In this calculation, if the mean square error value is less than any one of a plurality of preset values, the carrier recovery loop is operated.

At step 200 shown in FIG. 2(A), power is applied to the television system and also applied to the modem of FIG. 1. In step 202, initialization is performed in symbol timing recovery loop 110, matched filter 106, adaptive equalizer 108, and carrier recovery loop 112. The above initialization and control operations of the apparatus shown in FIG. 2(A) are performed by a system controller (not shown). In step 204, symbol timing recovery loop 110 operates to obtain timing information (i.e., synchronous clock signals, which are required for each part of the modem) from the data output through matched filter 106. In this case, adaptive equalizer 108 and carrier recovery loop 112 are set in the initialization step. In step 204 above, in the case when the symbol timing recovery loop 110 generates a stable synchronous clock signal, operation of the adaptive equalizer 108 is begun in step 206. Operation of adaptive equalizer 108 is performed using a filter coefficient capable of eliminating a ghost image caused by a multi-path signal having a determined time value, such as 10 μs, for all of the filter coefficients shown in FIG. 4. Calculation of the filter coefficient, which is set in step 206, is performed by the equalizer coefficient calculation & downloading circuit 416. In this case, the carrier recovery loop 112 is also set in the initialization step. In step 208, the mean square error value is compared with a first preset value. If the mean square error value is less than the first preset value, step 210 is performed. Otherwise, if the mean square error value is greater than the first preset value, step 206 is performed. That is, if the mean square error value is less than the first preset value, the carrier recovery loop 112 proceeds to operate.

In step 212, the number of filter coefficients for operation of the adaptive equalizer is increased. After completion of step 214, step 216 is performed, in which the mean square error value for the output of adaptive equalizer 108 is compared with a second preset value. At this point, if the error value is less than the second preset value, step 218 is performed, in which the mean square error value is compared with a third preset value.

By comparison of the magnitude of the first, second, and third preset values, the first preset value is the largest and the third preset value is the third smallest of the values (i.e., first preset value >second preset value >third preset value. Here, the reason why the error value is preset as discussed above is to reduce the range of the error value.

In step 220, after the adaptive equalizer 108 operates, step 222 is performed, in which the mean square error value is compared with a fourth preset value. The fourth preset value acts as a divergence limit value of the adaptive equalizer 108, and is preset for preventing divergence of the adaptive equalizer in the case where the adaptive equalizer is operated by extending the filter coefficient thereof to all the coefficients. Thus, the fourth preset value is greater than the third preset value. In the meantime, if the error value equals the divergence value, initialization is performed in step 224 and operation of the adaptive equalizer 108 returns to step 206. That is, in the case where the output error value of adaptive equalizer 108 is less than any of the preset values, operation of the adaptive equalizer, from step 208 to step 224, is to operate the modem by operating the carrier recovery loop 112.

Further, in a successive monitoring operation for monitoring the output error of the adaptive equalizer 108 during operation of the system, if the output error value is greater than any of the preset values, the adaptive equalizer is initialized and operation of the modem is repeated.

Here, an algorithm for updating the adaptive equalizer coefficients can use a blind equalization algorithm such as that disclosed by Godard in IEEE Transactions on Communication, pp. 1867–1875 (November 1980). Additionally, a Stop-and-Go algorithm proposed by Picchi and Prati in IEEE Transaction on Communication, pp. 877–887 (September 1987), is included in the known blind equalization algorithm. After operating the carrier recovery loop 112, the coefficient updating algorithm may use the same algorithm as that previously used. However, if a least means square (LMS) algorithm based on a decision-directed algorithm is used as the coefficient updating algorithm, it is possible to increase the convergence speed of the equalizer. In this case, if the mean square error, i.e., the MSE value, is less than the third preset value, it is necessary to use the coefficient intended to be updated as the value for all the coefficients. On the other hand, if the mean square error is more than the second preset value, the operation shown in FIG. 2(A) is again performed by initializing the adaptive equalizer. Additionally, if the MSE value is greater than the fourth preset value after using the coefficient of the adaptive equalizer intended to be updated as the value for all the coefficients, then the adaptive equalizer should be initialized.

Therefore, as mentioned above, in the case where operation of the adaptive equalizer is controlled as set forth above, the modem for the HDTV receiver can arrive at a normal state within a short period of time during initial operation of the HDTV receiver. Accordingly, it is possible to reduce the waiting time required at any point when a normal image and sound are obtained in the HDTV receiver.

As discussed in the foregoing description of the present invention, the HDTV adaptive equalizer can be controlled within a short period of time. Further, according to the present invention, operation of the modem, which includes an adaptive equalizer, is optimally controlled.

What is claimed:

1. A method for controlling the demodulating section of a modem of a high definition television system, comprising the steps of:

initializing a plurality of elements of the modem;

acquiring a synchronous clock signal from a received signal by operating a symbol timing recovery loop when an adaptive equalizer and a carrier recovery loop are initialized;

determining a first output error value for equalization of the received signal equalized by the adaptive equalizer when said carrier recovery loop is initialized; and operating said plurality of elements of said modem and said carrier recovery loop when said first output error value is less than a first preset value.

2. The method according to claim 1, wherein said plurality of elements comprises:

a matched filter, the adaptive equalizer, the symbol timing recovery loop, and the carrier recovery loop of said modem.

3. The method according to claim 1, further comprising the steps of:

monitoring said first output error value of said adaptive equalizer during operation of said modem; and initializing said carrier recovery loop and said adaptive equalizer if said first output error value is greater than the first preset value.

4. The method as claimed in claim 3, wherein each of said output error values is a mean square error of the output of said adaptive equalizer.

5. The method according to claim 1, wherein said adaptive equalizer includes a filter employing a plurality of filter coefficients, said step of determining a first output error value for equalization based on a subset of the plurality of filter coefficients.

6. The method according to claim 5, further comprising the steps of:

increasing the number of filter coefficients of the subset of the plurality of filter coefficients;

calculating updated values for the filter coefficients of the subset of the plurality of filter coefficients; and determining a second output error value for equalization of the received signal based on the updated subset of the plurality of filter coefficients.

7. The method according to claim 6, further comprising the steps of:

comparing the second output error value with second and third preset values;

updating all of the plurality of coefficients if the second output error value is greater than both the second and third preset values;

returning to the step of calculating updated values for the filter coefficients if the second output error value is greater than the third preset value; and initializing the adaptive equalizer if the second output error value is greater than the second preset value.

8. The method according to claim 7, further comprising the steps of:

calculating updated values for all the filter coefficients, if the second output error value is less than both the second and third preset values;

operating the adaptive equalizer using the updated values for all the filter coefficients to produce a third output error value; and comparing the third output error value with a fourth preset value, returning to the step of calculating updated values for all the filter coefficients if the third output error value is less than the fourth preset value, and initializing the adaptive equalizer if the third output error value is greater than the fourth preset value.

9. The method as claimed in claim 8, wherein said fourth preset value is greater than said third preset value which is greater than said second preset value which is greater than said first preset value.

10. A modem apparatus of a high definition television comprising:

tuner for tuning to a received radio frequency signal and output the received radio frequency signal to an IF filter to convert said received radio frequency signal into an intermediate frequency band;

demodulator connected to said tuner, for demodulating said converted signal;

filter for matching a signal demodulated by said demodulator;

symbol timing recovering unit for receiving an output of said filter to thereby generate timing information;

an adaptive equalizer for adaptively equalizing said filter output in order to compensate for degradation of said received signal, in response to said timing information of said symbol timing recovering unit; and recovery unit for recovering a carrier of said received signal by receiving an output of said adaptive equalizer.

11. The modem apparatus according to claim 10, wherein said adaptive equalizer comprises:

filtering unit having a first filter for FIR (Finite Impulse Response) filtering by receiving a real signal and a real coefficient, a second filter for filtering said FIR by receiving said real signal and an imaginary coefficient, a third filter for filtering said FIR by receiving said real coefficient and an imaginary signal, and a fourth filter for filtering said FIR by receiving said imaginary signal and said imaginary coefficient;

adding unit comprising a first adder and a second adder, said first adder subtracting an output of said second filter from the output of said first filter in said filtering unit, and said second adder adding outputs of said third and fourth filters; and equalization coefficient calculation and downloading unit for calculating an equalization coefficient using real and imaginary component signals output from said first and second adders in said adding unit to thereby provide said real coefficient and said imaginary coefficient.

* * * * *